United States Patent [19]

Clark

[11] 4,205,658
[45] Jun. 3, 1980

[54] HEAT TRANSFER PANEL

[76] Inventor: Peter C. Clark, 1545 Dwight Way, Berkeley, Calif. 94703

[21] Appl. No.: 839,936

[22] Filed: Oct. 6, 1977

[51] Int. Cl.² ............................................. F24J 3/02
[52] U.S. Cl. ................................. 126/444; 126/449
[58] Field of Search ............... 126/270, 271, 426, 432, 126/449, 450, 444; 237/1 A

[56] References Cited

U.S. PATENT DOCUMENTS

| | | | |
|---|---|---|---|
| 3,076,450 | 2/1963 | Gough | 126/271 |
| 3,215,134 | 11/1965 | Thomason | 126/271 |
| 3,991,742 | 11/1976 | Gerber | 126/271 |
| 4,010,733 | 3/1977 | Moore | 126/271 |
| 4,096,850 | 6/1978 | Hadcroft | 126/271 |

FOREIGN PATENT DOCUMENTS 2319858  2/1977  France ........................ 126/271
 325928  3/1928  United Kingdom ............. 126/271

*Primary Examiner*—Carroll B. Dority, Jr.
*Assistant Examiner*—Lee E. Barrett
*Attorney, Agent, or Firm*—Warren, Chickering & Grunewald

[57] ABSTRACT

A heat transfer panel is disclosed which can be used as a solar energy collector or as a heat rejecting and absorbing panel. The heat transfer panel employs a thin, flexible membrane mounted to the panel in a distorted condition to define, in part, a plurality of fluid channels. The membrane may take the form of a sealed envelope having inlet and collection means communicating fluid to and from the envelope or may simply be a single membrane. Preferably the membrane is mounted over and distorted against a support surface having side-by-side recesses formed therein. Several apparatus for distorting the membrane against the support surface to form fluid channels are disclosed, as are apparatus for incorporating the panel as an integral building element of a structure. The heat transfer panel is further formed for operation as a contained but low pressure fluid heat transfer system.

14 Claims, 6 Drawing Figures

HEAT TRANSFER PANEL

BACKGROUND OF THE INVENTION

In recent years considerable effort has understandably been directed toward the utilization of solar energy. While numerous advances have been made in the art, many systems are more theoretical than practical, and the problem of providing a low cost and yet reasonably efficient heat transfer panel remains.

An economical and yet efficient heat transfer panel could advantageously be used not only to collect solar energy, but also to radiate the collected energy to heat a structure. Conversely, a heat transfer panel can be used to absorb unwanted heat from a structure, with a second similarly formed panel used to radiate the absorbed heat to a black body, such as the night sky.

The heat transfer panel of the present invention relates to panels which are generally known as "flat plate collectors," although as above noted they can be used to reject heat as well as collect the same. Typical of prior art flat plate collectors are the devices shown in U.S. Pat. Nos. 3,146,774, 3,918,430, 3,943,911, 3,965,887 and 3,989,031. In the first of these patents, U.S. Pat. No. 3,146,774, water is distributed over an inclined planar surface and under a thin film held at a spaced distance from the surface by guide rods. Theoretically, as long as the flow rate is relatively low, the surface tension of the water flowing between the film and the backing of surface will cause the film to be drawn down toward the backing surface to relatively evenly distribute water over the backing surface for absorption of heat. Unfortunately, the distribution of water may be, and usually is, distributed over the planar support surface in less than an optimal manner. If the panel is not transversely level (a condition likely to occur on most roofs), water will gravitate preferentially toward the low side. Similarly, sagging of the support surface will cause preferential flow. The remaining four referenced patents are directed to flat plate collectors having either channels or protruberances which channel or divert flow of trickling water over a plate, usually with a blackened surface to absorb radiant heat. These panels further include additional glazing sheets to enhance heat transfer to the fluid by reducing convection and re-radiation losses from the collector. In such systems, however, condensation of water on the fluid channel defining surfaces or the glazing surfaces can be a problem, as can be the cost of construction of the panels.

U.S. Pat. Nos. 3,077,190 and 3,620,206 disclose solar energy collection systems which are designed for use in a horizontal orientation. Thus, these apparatus are positioned on substantially horizontal surfaces, but this horizontal orientation causes these systems to have a much lesser efficiency than can be achieved by an inclined, flat plate collector. It is known, for example, that for winter heat collection from solar radiation a collector panel should optimally be oriented at an angle from the horizon equal to the latitude of the location of the collector plus about 20° for maximum absorption of radiant energy from the sun. At a location having a 40° north latitude, the collector should be oriented at 60° from the horizon in a south or southwest facing direction. In addition to the horizontal systems of the above set forth patents, it is also known to position glazing materials on top of ponds to enable the ponds to act as solar collectors. Such glazing materials have taken a number of different configurations including the floating of sheets and tubes of transparent material on the ponds. Such glazing creates a "greenhouse" effect by reducing convection and re-radiation from the pond. Such horizontally oriented systems, however, will always suffer from the defect of being oriented at an angle to the sun which is relatively inefficient for the collection of solar energy. Accordingly, they require substantial area or land for any given quantity of heat absorption.

In U.S. Pat. No. 3,991,742, a solar energy collector is disclosed which is comprised of a large bag or panel formed from flexible sheets of material, which panel is positioned on a sloped surface such as a roof. The panel is preferably formed in a manner which enhances distribution of the flow of water between the sheets comprising the panel. Roof sagging and lateral slope, however, will cause preferential flow. Moreover, such an approach encounters heat transfer problems in that the upper surface will not always be in contact with the moving water, particularly because starting of the pump will invariably introduce air into the bag.

Finally, an article entitled "Solar" in the November, 1976 issue of *Sunset Magazine*, pages 79-89, discloses several types of flat plate solar collectors. Collectors are described which employ tubes and heat absorption plates, rigid sandwiches of metals, and open, corrugated panels having water trickled over upwardly facing surfaces. These systems, however, make various unsatisfactory tradeoffs between cost and efficiency. In closed, pressurized systems leakage is a constant problem. In addition to the problem of the cost of copper tubing, the problem of galvanic action is often present between the copper and aluminum absorption plates. Galvanic action inhibitors interface with heat transfer and therefore cut down efficiency. In open systems costing less, evaporation of the collector fluid is particularly troublesome, since it will reduce fluid temperature and collect on glazing surfaces to substantially further reduce heat transfer efficiency.

SUMMARY OF THE INVENTION

A. Objects of the Invention

Accordingly, it is an object of the present invention to provide a heat transfer panel which is relatively inexpensive to construct, maintain and operate and yet provides a mechanism for relatively efficient absorption of radiant energy, and particularly solar energy.

Another object of the present invention is to provide a heat transfer panel of the flat plate solar heat collector type which can be formed from readily available construction materials and is accordingly compatible with conventional home building practices.

It is another object of the present invention to provide a heat transfer panel in which the efficiency of absorption of radiant energy has been enhanced in an essentially zero pressure system.

Another object of the present invention is to provide a heat transfer panel which is less susceptible to leakage, blockage, frost damage, condensation interference, and evaporation.

Still another object of the present invention is to provide a heat transfer panel which can be used as a solar collector for the absorption of solar radiation and can also be used as a radiating or heat absorbing panel inside a home, office, school or other structure.

A further object of the present invention is to provide a heat transfer panel of the flat plate solar collector type which can be employed as an integral structural roof element, as well as being formed for positioning on top of an existing roof or bracket mounted remotely of a building.

Another object of the present invention is to provide a heat transfer panel which is durable, has a longer operating life, and is easy to maintain and repair.

The heat transfer panel of the present invention has other objects and features of advantage which will become apparent from and are set forth in more detail in the following description of the preferred embodiments and the accompanying drawing.

B. Brief Summary of the Invention

The heat transfer panel of the present invention includes a support surface means, a flexible membrane extending over the support surface means, and inlet and collection means formed to communicate fluid to and collect fluid from the panel. The improvement in the heat transfer panel comprises, briefly, the membrane being in distorted condition with the distortions extending over substantially the entire area of the panel and defining, at least in part, a plurality of fluid channels for the flow of fluid in contact with the distorted membrane. In one aspect of the present invention the support surface means is provided as a continuous surface having a plurality of side-by-side recesses therein and the distorted membrane is in the form of a fluid-tight envelope with the inlet and collection means communicating to the inside of the envelope. Additionally, heat transfer enhancing means, such as glazing members, press or distort the envelope against the support surface so that the envelope conforms to the recesses in the support surface and the cross-section of the fluid channels inside the envelope is relatively narrow and even. In another embodiment of the present invention, the heat transfer panel is formed for flow of a heat transfer fluid between the distorted film membrane and the support surface with the membrane again preferably being held by glazing means in a distorted condition against receses in the support surface. In still another embodiment of the present invention, the membrane is in the form of a watertight envelope and is held against a support surface having recesses. The support surface alone may act as a heat transferring surface or, in the preferred embodiment, a second heat rejecting surface is employed and the membrane is distorted against it from within through hydraulic pressure.

DESCRIPTION OF THE PREFERRED EMBODIMENTS

Figure 1:
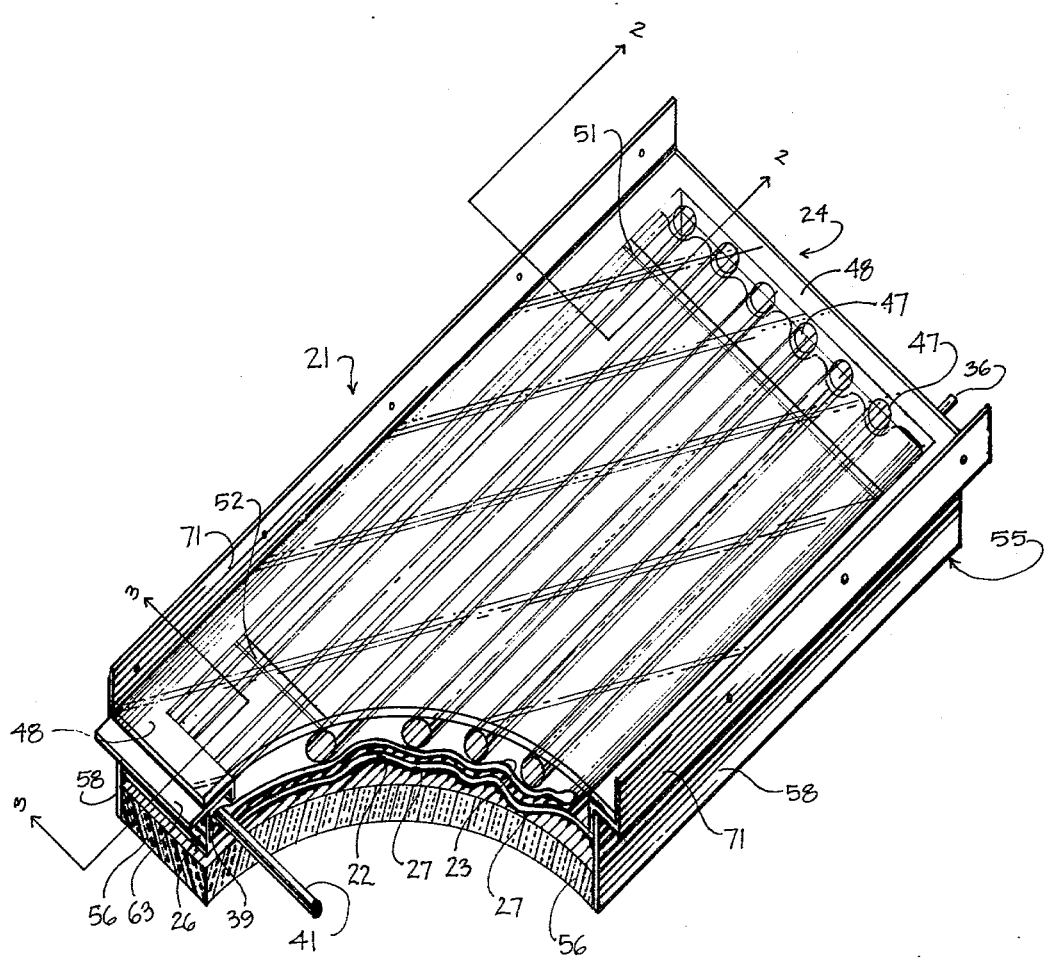
FIG. 1 is a top perspective view, partially broken away, of a heat transfer panel constructed in accordance with the present invention.
Figure 2:
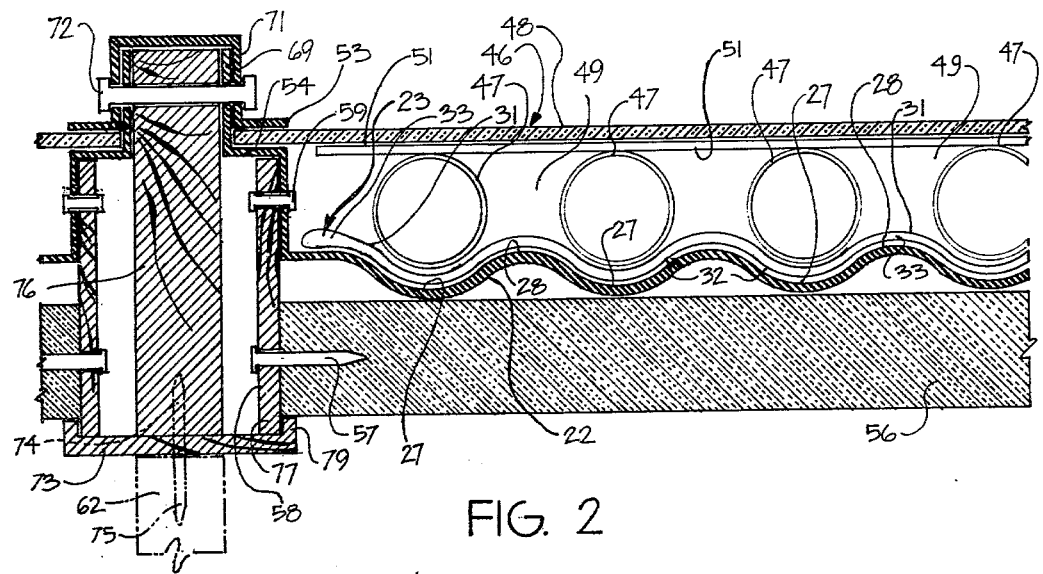
FIG. 2 is an enlarged, fragmentary, cross-sectional view, taken substantially along the plane of line 2—2 in FIG. 1 and showing the panel coupled to an adjacent panel.
Figure 3:
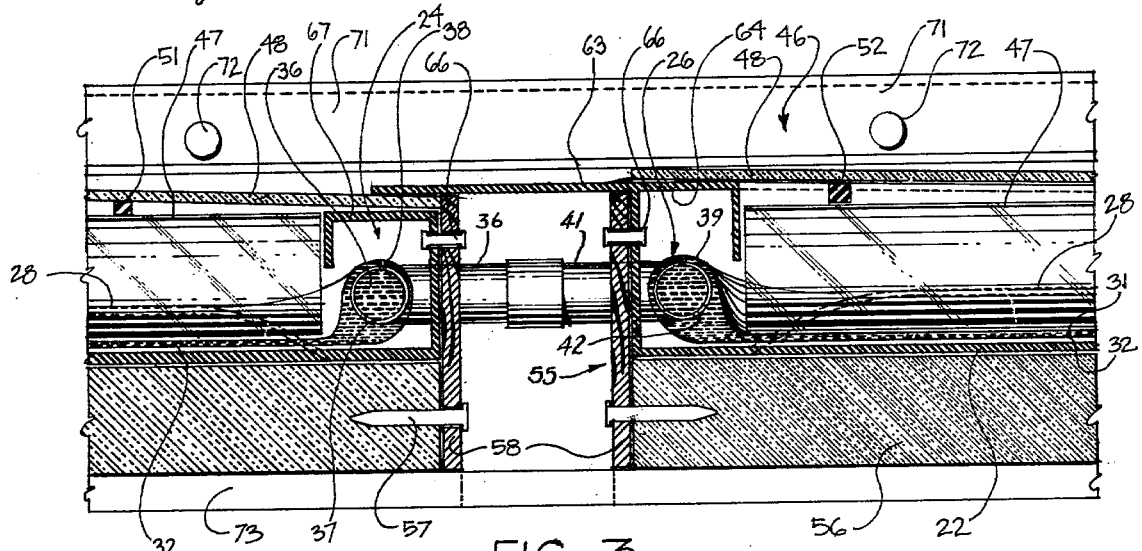
FIG. 3 is an enlarged, fragmentary, cross-sectional view, taken substantially along the plane of line 3—in FIG. 1 and showing the panel coupled to an adjacent similarly formed panel.

Referring now to FIGS. 1, 2 and 3, a heat transfer panel, generally designated 21, can be seen to include support surface means, generally designated 22, over which a flexible membrane, film or sheet, generally designated 23, extends. The panel also includes inlet means 24 and collection means 26 formed to communicate a heat transfer fluid, such as water, to and from panel 21. As will be understood, the heat transfer fluid can be fluids other than water, for example, various oils. Water is, however, the most readily available, efficient and inexpensive fluid which can be used with the panels of the present invention.

As thus far described, the heat transfer panel of the present invention contains elements which can be found in prior flat plate solar collectors. The improved aspect of the heat transfer panel of the present invention, however, is that the flexible membrane 23 is mounted to said panel in a distorted or displaced condition, with the distortions extending over substantially the entire heat absorbing area of the panel to define, at least in part, a plurality of fluid channels for the flow of fluid in contact with the distorted membrane. Moreover, distorted membrane 23 and support surface means 22 for the membrane are cooperatively formed to contain and evenly distribute the heat transfer fluid in the fluid channels under little or no pressure.

Support surface means 22 can take a number of different forms. It can, for example, be a discontinuous surface such as would be provided by a plurality of spaced apart, side-by-side, cylindrical members. Membrane 23 would pass over and under the cylindrical members to produce a distorted membrane. It is preferred, however, to provide support surface means 22 as a continuous sheet material or surface having a plurality of side-by-side recesses 27 formed therein. Corrugated aluminum sheets provide an excellent support surface for use in heat transfer panel 21 in that they are durable, relatively inexpensive, provide recesses 27, and can be readily deformed or worked in order to enable their use with other elements of the panel.

The use of recesses, per se, in a flat plate solar heat collector is known. The recesses or channels are an attempt to overcome preferential channeling which occurs when a planar surface is employed. It is better to have the liquids relatively evenly distributed in a predetermined number of known channels than to distribute the liquid over a planar surface and have preferential channeling occur at unpredictable points.

While the use of channeled flow alone is not new, prior art collectors employing channels have either used open systems in which water evaporation or condensation has greatly reduced efficiency, or closed systems inherently having poor contact between the heat absorption surface and the fluid. Closed pressurized systems with attendant leakage problems have also been used. Moreover, whether open or closed, to the extent high efficiency could be obtained, it has been accompanied by high panel cost.

The panel of the present invention provides a closed system in which the fluid is under essentially zero pressure, and yet the fluid is uniformly and evely distributed across the entire surface of the panel in a thin cross-section and is in intimate contact with the radiant heat absorbing surface. Moreover, the present heat transfer panel is simple and inexpensive to construct.

It is also known to employ films or flexible membranes in flat plate solar collectors, but primarily as glazing surfaces or in connection with flat plate collectors which employ surface tension or Bernoulli's principle to attempt to get an even distribution of the fluid over the flat plate. As above noted, such approaches depend upon transversely level panel orientation and a total lack of sagging or deformation of the planar surface to avoid preferential and unpredictable water channeling. The panel of the present invention will operate efficiently even under transversely sloped conditions and even when there is sagging or irregularities in the panel support surface.

In the panel of the present invention, the distorted film or membrane defines or provides flid channels of relatively thin and uniform cross-section, and the membrane alone or in combination with a support surface provides a closed or contained system, with membrane flexibility and fluid flow rate providing a system of essentially zero pressure.

The heat transfer panel of FIGS. 1, 2 and 3 is designed as a relatively high temperature solar heat collector of the type which can be advantageously employed for home heating or the heating of other structures such as schools, offices, factories, etc. In such applications, of course, it is highly desirable to reduce the possibility of leakage of the heat transfer fluid from the panel and for the system to have the lowest possible maintenance requirements. Accordingly, in the form of the panel shown in FIGS. 1, 2 and 3, membrane 23 is formed as a fluid-tight envelope, best seen in FIGS. 2 and 3, which is distorted or displaced downwardly against support surface recesses 27. Thus, membrane 23 preferably includes an upper flexible sheet portion 31 and a lower sheet portion 32 defining fluid channel 33 therebetween. The upper and lower sheet portions 31 and 32 are sealed together proximate the edges to provide the fluid-tight envelope, and the area of the sheet portions 31 and 32 is sufficient so that they can be distorted down into recesses 27 over substantially the entire area of support surface means 22.

In order to communicate the heat transfer fluid to the fluid channels 33 between the distorted membrane sheet portions, inlet means 24 preferably takes the form of a transversely extending distribution tube or manifold 36 having openings 37 periodically over the length thereof at positions proximate recesses 27. The inlet tube 36 passes through and is mounted in sealed relation to an enlarged end 38 of membrane envelope 23, as best may be seen in FIG. 3. In a similar fashion, enlarged opposite end 39 of the membrane envelope has positioned therein collection means 26 including a transversely extending collection tube 41 having openings 42 for collection and receipt of water.

In order to insure that panel 21 operates at a very low or essentially zero pressure, openings 37 in the inlet tube are preferably smaller than openings 41 in the collection tube. Opening 37 act as metering orifices for the flow of fluid into channels 33 while openings 41 receive the fluid as fast as it gravitates to the bottom of the panel. The flow rate into the panel is never fast enough to cause fluid build-up in the panel.

Distortion of membrane 23 into conforming contact with support surface channels 27 can be accomplished in a number of different manners. It is preferable when the panel is to be used as a solar heat collector to employ heat transfer enhancing means, generally designated 46, which is positioned in superimposed relation to support surface 22 with the membrane disposed between the support surface and the heat transfer enhancing means. In the form of the invention shown in FIGS. 1, 2, and 3, the heat transfer enhancing means is provided as glazing means in which there are a plurality of elongated transparent tubular members 47 each having a lower surface formed to be of a complementary cross-section to the cross-section of the support channels or recesses 27 so that they can be positioned in mated or nesting relation to recesses 27. The tubular glazing members 47 are mounted on top of envelope or membrane 23 so as to distort the same, and their transparent nature permits radiant energy to pass therethrough to the water of heat transfer fluid moving in fluid channels 33 inside the distorted envelope. Although tubular members 47 act as glazing means, it is further desirable for the heat transfer enhancing means 46 to include an additional glazing member, preferably a continuous transparent sheet 48 positioned in superimposed relation to tubular members 47 so as to define "dead air" pockets or spaces 49 intermediate the tubular members.

In order to reduce the chance of breakage when the glazing members 47 and 48 are formed of glass, and further in order to reduce conductive heat transfer between the glazing members 47 and 48, regardless of the glazing material, it is advantageous to provide spacing strips 51 and 52 which extend transversely across tubes 47. The spacing strips are advantageously formed of a material having a relatively low thermal conductivity and a degree of resiliency, such as rubber, and the strip 51 at the inlet end of the panel is thinner in cross-section than is the strip 52 at the outlet end of the panel for reasons which will be set forth more fully hereinafter.

The assembly of glazing members forming the heat transfer enhancing means 46 creates the well known "greenhouse" effect inside the solar collector and reduces heat transfer from the panel through convection and re-radiation. As was above noted, the glazing means 46 also distorts and maintains the distortion of the envelope formed by membrane sheet portions 31 and 32. Distortion of membrane 23 into recesses 27 causes a distention or pulling down of the membrane over the portions 28 of support sheet 22 between recesses 27. Water flowing between membrane sheets 31 and 32 will not only flow in superimposed relation to the recesses, but will also be forced up for flow on top of protruding portions 28. Thus, the expression "fluid channels" shall include channels for flow on top of the support surface intermediate the recesses. The fluid flow channels 32 over recesses 27 and protrusions 28 are both of relatively thin and uniform cross-section to insure good thermal contact with the heat transfer fluid.

It is important to note that while distention and distortion of membrane 23, in FIGS. 1-3 by glazing means 46, is sufficient to cause water to flow on top of portions 28, the flexibility of membrane 23 insures further that pressure does not fuild up in the system. If, for example, one tubular member 47 is jammed down into a recess 27, water is simply displaced laterally to a position over a portion 28. The panel does not become pressurized, and accordingly the potential for leakage is minimized.

Moreover, flow of fluid still occurs in a plurality of channels in that while fluid is forced up for flow over portions 28, it is not free to gravitate laterally across the panel because the distorted nature of the membrane over the protrusions, as well as the weight of the tubular glazing members, limits such lateral gravitational migration of fluid. There will be a lateral gravity effect on the tubes and the "up-hill" portion of the protrusions will limit lateral gravity movement of the water. This is also true as to lateral movement which could occur as a result of sagging of a middle section of the panel.

In the preferred orientation of the panels of the present invention for winter radiant energy collection, the panel 21 is inclined at about the latitude of the collection site plus 20° and oriented to face south or southwest. For many parts of the United States this can be an orientation of 60° from the horizon, or more. Such a slope of the panel reduces the effect which gravity will have in maintaining the tubes 47 in mating relation to channels 27. Accordingly, the spacers 51 and 52 and glazing sheet 48 act to limit the degree to which the tubes 47 can be displaced away from the support surface 22. In this regard, it is advantageous to provide means, such as a lip 53 on longitudinally extending U-shaped member 71 which limits the outward displacement which glazing sheet 48 can experience. In the preferred form of the panel, glazing sheet 48 is sealed to the Z-shaped edge portion of support sheet 22 and the lip 53 is sealed to glazing sheet 48 by a caulking compound. The distance between the glazing sheet 48 and support surface 22, as well as the thickness of the resilient spacers 51 and 52, is selected so that the tubes 47 have a limited ability to float or be displaced away from the sheet 22 under hydrostatic fluid forces. Thus, tubes 47 are to a limited degree gravity biased toward sheet 22, with the outward displacement being limited by the spacers and glazing sheet 48. The distance between the glazing sheet 48 and support surface 22 and the thickness of spacers 52 is selected so that in the outwardly most displaced position of tubes 47, the fluid passageways 33 are still very thin for effective and efficient heat transfer to the fluid.

As will be appreciated, other heat transfer enhancing means, and in the case of the panel of FIGS. 1–3 other glazing means, can be employed with the panel of the present invention. It is, however, a further feature of the present invention that the materials shown in the panel of FIGS. 1–3 can be relatively low-cost materials which are readily available in the construction industry. Support surface 22, for example, can be provided by a corrugated aluminum sheet of the type in widespread use as roofing and paneling for a variety of structures. The tubular members 47 can be advantageously provided by uncoated fluorescent tube lamp glass. Conventional and readily available b 1 inch diameter fluorescent lamp glass has a width dimension or diameter which is preferably slightly less than the diameteter or radius of curvature of the recesses 27 in conventional corrugated aluminum sheets. Thus, the lamp glass tube will mate with the corrugations and can extend longitudinally over substantially the entire length of the corrugations so as to hold or maintain the membrane 23 in distorted condition against the corrugations.

As is normally required with flat plate solar heat collecting panels, at least one surface of collector 21 is preferably of a dark, radiant heat absorbing color, such as black. This can be accomplished by providing distorted membrane 23 as a black material, or support surface 22 can be black, with the membrane 23 being transparent, but distorted into conforming contact therewith. The preferred approach, however, is to provide the membrane as a black heat absorbing surface.

Additionally, it is desirable, in order to avoid heat loss from the panel, to provide the panel of the present invention with heat insulating means 56 positioned subjacent the support surface or corrugated sheet 22. Insulating means 56 can take the form of a pre-formed sheet which is fastened, as by fastener 57, to frame member 58 beneath sheet 22. Optionally, the heat insulating means 56 can be formed in place beneath corrugated sheet 22, as is shown in connection with the modified form of the invention of FIG. 4. Frame member 58 may be advantageously formed of a material having low thermal conductivity, such as wood, and the support sheet 22 can be fastened by a fastener 59 to Z-shaped edge portion 54 of sheet 22. Since corrugated aluminum sheeting is preferred for use in the panel of the present invention, the Z-shaped edge portion 54 can be readily formed as an integral part of the sheet by a metal press or the like.

The heat transfer panel of FIGS. 1–3 is designed for use in home heating applications with relatively high operating temperatures, for example, temperatures in the range of about 140° F. to about 180° F. (while water is flowing through the panel). A typical water flow rate is 1 gallon per minute per 24 square feet of panel surface. Such high water temperature together with direct solar radiation have a potential to greatly reduce the life of many plastic membranes which would be otherwise suitable for use in a panel. It has been found that a plastic membrane that is particularly well suited for use in the panel of FIGS. 1–3 is a fluorocarbon polymer such as polytetrafluoroethylene, sold under the trademark TEFLON. TEFLON films will withstand relatively high water temperatures without degradation of their physical characteristics and useful life.

Although TEFLON films have poor surface wetting characteristics, the heat transfer panel of the present invention is formed in a manner which overcomes any problem which would otherwise be present. The panel membrane is distorted in a manner producing relatively thin fluid channels 33, which will insure an even distribution of water within the channels, notwithstanding poor wetting characteristics of the membrane. Thus, the long life and other advantageous charcteristics of TEFLON can be taken advantage of and a relatively high temperature collector employed because of the distorted membrane approach which insures wetting of the membrane surfaces and complete filling of the fluid channels 33.

It is a further important feature of the present invention that the heat transfer panel be formed so that it can be used as a roofing panel which is integrated into a roof structure. Instead of merely mounting panel 21 on top of the roof, the panel is provided with frame means, generally designated 55, formed for mounting of the panel to a sloping roof rafter 62 (FIG. 2). Frame means 55 includes a lip portion 63 (FIGS. 1 and 3) which extends along a lower edge or side of panel 21 to a distance and at a height overlapping a similarly formed panel. This overlapping can best be seen in FIG. 3 wherein portion 63 overlaps glazing sheet 48 along an upper edge of the adjacent panel. Thus, water running along the top surface of glazing sheet 48 will fall under the influence of gravity first onto lip 63 and then onto the next adjacent glazing sheet 48.

Frame means 55 includes an extruded channel section 64, which has lip portion or skirt 63 thereon, and is secured to frame member 58 by a rivet 66 or other suitable fastener. Each panel is provided with a similar extrusion 67 along the top edge of the panel which is at a lower height so that lip 63 will pass over extrusion 67 and the sheet of glazing material 48. As can be seen, the difference in thicknesses between spacers 51 and 52 and the heights of extrusions 64 and 67 causes the glazing sheet to be tilted outwardly from support surface 22. Extrusions 64 and 67 also provide transversely extending housings for the collection and inlet pipes, as well as supports, for the glazing surfaces 48.

In addition to providing a watertight overlapping fit along the upper end and lower edges of the panels, the panels of the present invention are further formed to accommodate a watertight fit along the side marginal edges of the panel. Thus, frame means 55 further includes longitudinally extending edge portions which are formed for overlapping engagement with sealing means extending in the direction of slope of the roof rafters 62. The longitudinally extending edge portion is here provided by Z-shaped edge portion 54 having an upwardly extending leg 69 over which a sealing means 71, in the form of an inverted U-shaped longitudinally extending extrusion, may be positioned and held in place by rivet or fastener 72. The overlap of longitudinally extending cap 71 with leg portion 69 plus the overlapping of lip 53 with glazing sheet 48 provides a watertight seal along the edges of the panel.

Mounting of the heat transfer panels of the present invention on rafters can be accomplished by several techniques, but it is preferable to provide a U-shaped bracket or support member 73 which can be positioned immediately on top of rafter 62. For ease of assembly, the spacer member 76 can be secured to support bracket 73 by a fastener 74. It should be noted that spacer block 76 need not extend over the full length of the rafter 62. Instead, it is preferable to provide short spacer blocks 76 at periodic intervals along the length of the rafter, which blocks are nailed to U-shaped member 73. The U-shaped member is then positioned over the rafter 62 and nailed down to rafter 62 by nails 75 at positions intermediate the spacer blocks 76. Once nailed in the proper position on rafter 62, the heat transfer panel 21 can be rested upon the support bracket with the lower edge 77 of frame member 58 passing down over the upstanding leg portion 79 of the support bracket so as to secure the assembly together as a unit.

Figure 4:
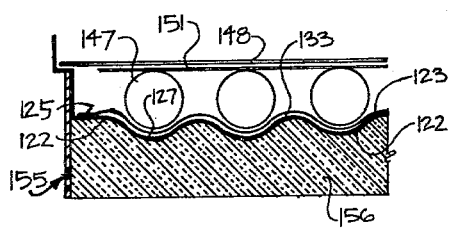
FIG. 4 is a cross-sectional view corresponding to FIG. 2 of an alternative embodiment of the heat transfer panel of the present invention.

Referring now to FIG. 4, a modified form of the heat transfer panel of the present invention is shown. Panel 121 includes a support surface 122 having a flexible membrane 123 extending thereover. The panel also includes inlet means (not shown) and collection means (not shown) formed to distribute a fluid to and collect fluid from the panel. In the panel of FIG. 4, support surface 122 is again formed with a plurality of side-by-side recesses 127, but the fluid flow channel 133 is disposed between membrane 123 and support surface 122, rather than inside a distorted membrane envelope. The heat transfer panel also includes membrane distorting means 147, preferably in the form of tubular glazing members, and a second glazing panel 148, mounted in superimposed relation thereto by spacer element 151. Additionally, the panel includes frame means 155 and thermal insulating material 156. As shown in FIG. 4, however, material 156 may advantageously take the form of a foamed-in-place insulator which conforms to the back side of surface 122.

When a single distorted membrane is employed to define the fluid flow channel 133, it is further preferable to provide a closed system by sealing the membrane at the side marginal edges 125 to support surface 122. The membrane 123 will have enlarged ends (not shown) through which the inlet means and collection means can be mounted and sealed. As will be appreciated, when the support surface 122 is used to define, in part, the fluid channel, it would also be possible to seal the inlet and collection tubes to the support surface 122, instead of the membrane 123.

The panel of FIG. 4 will have the advantage of a distorted flexible membrane approach in that the distorting members 147 tend to float within limits to cause thin cross-section flow channels with membrane flexibility preventing pressure build-up and reducing the incidence of leakage. The panel of FIGS. 1-3 avoids any problem of attempting to seal the membranes to the support panel, but the essentially zero or low pressure operation greatly reduces the likelihood of leakage.

Figure 5:
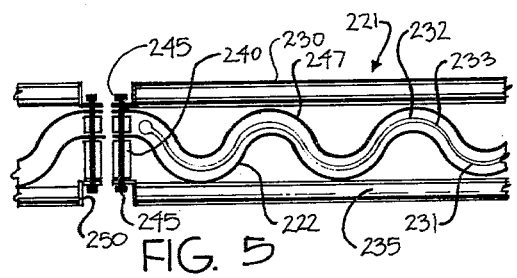
FIG. 5 is a cross-sectional view corresponding to FIG. 2 of still another alternative embodiment of the heat transfer panel of the present invention.

In the heat transfer panels thus far described, the means for distorting the membrane has been comprised of a plurality of objects which are free for independent movement with respect to each other. This approach insures that the fluid channel defined by the distorted membrane will have a relatively uniform cross-section. Thus, hydrostatic forces generated in the fluid channels will displace the distorting member to a relatively centered position in relationship to the recess or channel in the support surface. In FIG. 5, a further modified embodiment of the heat transfer panel of the present invention is shown in which the membrane defining the fluid channel is distorted by two pre-formed, continuous, mating surfaces.

Panels of the type shown in FIG. 5 are primarily designed for use in systems that operate at a lower temperature than home heating systems. The heat transfer panel of FIG. 5, for example, can be advantageously employed to heat water for a swimming pool with the water temperature typically runnning in the about 80° to about 110° range. Thus, panel 221 includes a support surface 222 upon which a membrane, generally designated 223, is positioned. The membrane is in the form of an envelope having a lower sheet portion 231, an upper sheet portion 232, and a fluid channel 233 defined therebetween. In order to hold the membrane 223 in a distorted position over support surface 222, a second rigid surface 247 formed to mate or nest with support surface 222 is positioned in superimposed relation to the support surface and membrane envelope. In order to provide a high strength, self-supporting unit, it is preferable that both support surface 222 and the distortion surface 247 may advantageously be formed from corrugated sheets of aluminum, with the upwardly facing sheet darkened to provide a radiant energy absorption surface. Optionally, support sheet 222 may be formed of aluminum while distortion means 247 can be formed of a transparent or translucid plastic, which acts as glazing means, and the envelope 223 can be darkened or black.

It is preferable to maintain the opposed corrugated sheets 222 and 247 secured together as a unit in very close relation. This can be accomplished by holding the sheets together by clamping means, such as transveresly extending bars 230 and 235, which may be urged against each other or against spacer means 240 by connecting means 245, such as a nut and bolt. The assembly can be further formed with mounting brackets 250 which can be used to secure the panel to a frame or other structure 260.

As shown in the drawing of segment 30, the sheets 222 and 247, as well as the distorted membrane 223, are vertically spaced from each other to a much greater degree than would be employed in practice. Typically, the inner surfaces of sheets 222 and 247 should be nested together with membrane envelope 223 therebetween, and fluid flow will flex the panels outwardly intermediate the clamping means, if necessary.

The fluid channel 233 will, at least in places and on the average, be somewhat larger in cross-section than that which will be present in the panels of FIGS. 1-4. Since the cross-section of the channel is somewhat greater, the material from which membrane 223 is formed may advantageously be surface hydrophilic. The spacing of the sheets cannot be relied upon to force the fluid into all areas of the envelope. Accordingly, the membrane for the panel of FIG. 5 should have a surface affinity for water to avoid gaps and voids between the sheets of the membrane and to avoid a reduction in panel efficiency. One such material which is suitable for use in the panel of FIG. 5 is a polyester film which is sold under the trademark TEDLAR by DuPont Company. While TEDLAR does not have some of the advantages mechanical characteristics and life of TEFLON under high temperatures, it is contemplated that the heat transfer panel of FIG. 5 will be operated at much lower temperatures, and TEDLAR films have good mechanical characteristics and life at these lower temperatures. The panel of FIG. 5 may be operated at a flow rate of 10 per minute per 24 square feet of panel surface.

Figure 6:
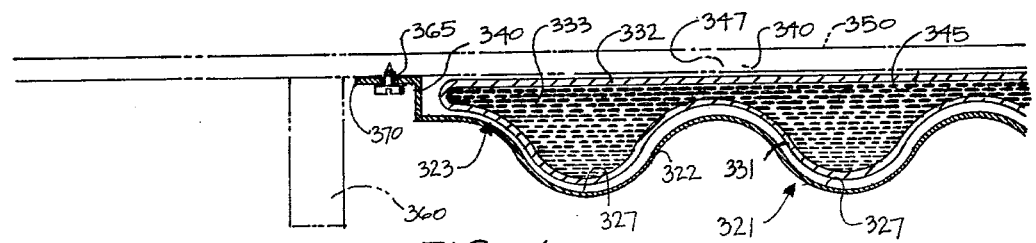
FIG. 6 is a cross-sectional view corresponding to FIG. 2 of a third alternative embodiment of the heat transfer panel of the present invention.

The heat transfer panels of the present invention can be employed not only to absorb or collect radiant energy, but also to reject or transfer heat to a space or body. Thus, one panel may be employed on the roof of a structure to collect solar energy while another panel can be used as part of a heat transfer system inside the structure to reject or transfer the collected heat to the structure. It is preferable to employ a distorted membrane panel as shown in FIG. 6 when rejection (radiation, convection and conduction transfer) of energy, instead of collection, is to be accomplished. Panel 321 includes a support surface 322 having a plurality of side-by-side channels or recesses 327 formed threin. Membrane 323 takes the form of an envelope mounted on the support surface with sheet portion 331 in engagement with and conforming to the channels 327 in the support surface. The opposite sheet portion 332 of the membrane is mounted in thermal contact with a heat transfer rejection member 347 having a first or inner surface 345 and a second or outer rejecting surface 350. Heat transfer member 347 can be a portion of the floor, wall or ceiling of the structure to be heated. Thus, floorboard members 347 can be mounted on joists 360, with panel 321 secured immediately underneath the floorboard 347 by a fastener 365 passing through a side marginal flange 370 formed in the support surface 322. Hydraulic pressure inside fluid channels 333 will distend sheet portion 322 upwardly toward surface 345 so as to urge the sheet against member 347. In order to reduce the incidence of abrasion, an intermediate abrasion resistant sheet 340 can be positioned between sheet portion 332 and first surface 345. Since the function of intermediate abrasion resistant sheet 340 is to reduce the friction which might occur upon distention of the upper sheet portion 32 up against surface 345, the abrasion resistant sheet 340 can be relatively thin, such as a sheet of kraft paper or the like, and it will not interfere materially with heat transfer to member 347. The formation of support surface 322 with recesses or channels 327 insures uniform flow within the panel, particularly overcoming any sagging of the panel, which in turn combines with the enhancement of efficiency achieved by distending the upper membrane portion 332 into contact over substantially the entire bottom surface 345 of the heat transfer member 347.

It is also possible to employ the panel of FIG. 5 in a ceiling installation in which support surface 322 acts as the heat rejecting and absorbing surface.

The heat rejecting panel of FIG. 6 is designed for operation at a mean temperature of about 125° F. with a flow rate of about 1 gallon per minute per 100 square feet of panel.

What is claimed is:

1. A heat transfer panel including support surface means, a flexible membrane including an upper sheet portion and a lower sheet portion sealed together to provide a fluid-tight envelope, said envelope extending over said support surface means, and inlet means and collection means formed and connected to communicate a fluid to and collect said fluid from within said envelope, wherein the improvement in said panel comprises:

said panel having a heat transfer area, said support surface means being formed for support of said lower sheet portion in a distorted condition under the influence of gravity on said lower sheet portion and said fluid on said lower sheet portion, said lower sheet portion being supported by said support surface means with relatively elevated portions of said lower sheet portion and relatively recessed portions of said lower sheet portion, and distortion means positively urging said upper sheet portion into mating relation with said lower sheet portion and into contact with said fluid over said relatively recessed portions to urge said fluid into said relatively elevated portions, said upper sheet portion as distorted by said distortion means and said lower sheet portion as supported by said support surface means defining fluid channels in both said relatively elevated and said relatively recessed portions for flow of fluid in contact with said distorted upper sheet portion for heat transfer over substantially the entire heat transfer area of said panel including said elevated portions.

2. A heat transfer panel as defined in claim 1 wherein, said surface means is formed as a continuous surface having a plurality of side-by-side protruding portions and recesses extending over the heat transfer area of said panel, and said distortion means is formed to distort said upper sheet portion into a position substantially conforming to the configuration of said protruding portions and to produce said relatively elevated portions and said relatively recessed portions of said membrane.

3. A heat transfer panel having a heat transfer area including a support surface formed with a plurality of side-by-side protruding portions and recesses therein, a membrane formed and sealed to provide at least one fluid-tight flexible envelope, said envelope being supported on said support surface in said heat transfer area, inlet means communicating with and formed to distribute a fluid inside said envelope, and collection means formed to collect said fluid from inside said envelope, wherein the improvement in said panel comprises:

distortion means formed for and distorting said envelope to substantially conform at least one fluid channel inside said envelope superimposed over a protruding portion of said support surface and at least one adjacent fluid channel inside said envelope superimposed over a recess in said support surface with the adjacent fluid channels interconnected for flow of fluid therebetween, and said distortion means distorting an upper sheet portion of said envelope positively into contact with said fluid to produce the fluid in said fluid channel superimposed over said protruding portion as well as in said fluid channel superimposed over said recess.

4. A heat transfer panel as defined in claim 3 wherein, said envelope has an area sufficient to extend over and is distorted to conform to a plurality of said protruding portions and said recesses to provide a plurality of side-by-side fluid channels inside said envelope over said protruding portions as well as said recesses.

5. The heat transfer panel as defined in claim 3 wherein,
said distortion means and said support surfaces are both provided by corrugated sheets having mating corrugations and mounted in nested relation with said envelope positioned and distorted therebetween.

6. The heat transfer panel as defined in claim 5, and clamping means formed to secure said corrugated sheets together as a unit, and wherein said envelope is formed of a plastic film having a hydrophilic surface.

7. The heat transfer panel as defined in claim 3 wherein,
said panel is further provided with frame means formed for mounting of said panel to sloping roof rafters, said frame means having a lip portion formed to extend outwardly and downwardly along a lower edge of said panel to a distance and at a height overlapping a similarly formed panel positioned on said roof rafters immediately adjacent to and below the first named panel.

8. The heat transfer panel as defined in claim 3 wherein,
said envelope is formed from a sheet of polytetrafluoroethylene.

9. A heat transfer panel including a support surface, a flexible membrane extending over said surface, inlet means communicating with and formed to distribute a heat transfer fluid between said surface and said membrane, and collection means formed to collect said fluid from between said surface and said membrane, wherein the improvement in said panel is comprised of:
said surface being formed with a plurality of side-by-side elongated protruding portions and recesses therein, said membrane having sufficient flexibility and area to enable said membrane to be distorted to substantially conform to the configuration of said protruding portions and said recesses, and distorting means positioned in engagement with said membrane and biased toward said support surface to positively distort said membrane toward said support surface and against said fluid for distribution of said fluid for flow between said membrane and said support surface including the area of said support surface over said protruding portions, as well as over said recesses,
said membrane being sealed to said support surfaces at side marginal edges thereof, and said inlet means and said collection means are formed for flow of fluid to and from said panel at rates preventing a pressure build-up in said panel, and said inlet means and said collection means are each mounted in sealed relation to one of said membrane and said support surface.

10. A heat transfer panel formed for use as a solar heat collector and including a support surface formed with a plurality of side-by-side recesses therein, a flexible membrane formed and sealed to provide at least one fluid-tight envelope, said envelope being supported on and being distorted to substantially conform to the configuration of said support surface to provide a plurality of side-by-side fluid channels inside said envelope, inlet means and collection means passing through and being monted in sealed relation to said envelope for communication of fluid to and from said fluid channels, and glazing means positioned in superimposed relation to said envelope, wherein the improvement in said panel comprises:
said glazing means having a lower surface formed of complimentary cross-section of said recesses over at least a portion of the length of said recesses, and said glazing means being mounted on top of said envelope in mated relation to said recesses to distort said envelope into fluid channels each having a relatively narrow cross-section.

11. The heat transfer panel as defined in claim 10 wherein,
said glazing means is provided as a plurality of elongated transparent members each having a width dimension for positioning in one of said recesses and a length dimension extending substantially over the full length of said recesses.

12. The heat transfer panel as defined in claim 11 wherein,
said recesses are formed with an arcuate cross-section,
said transparent members are substantially cylindrical tubular members,
said glazing means further includes a continuous glazing member positioned in superimposed relation above said tubular members, and
spacer means positioned between said tubular members and said continuous glazing member.

13. The heat transfer panel as defined in claim 11 wherein,
said support surface is provided by a corrugated sheet, and
heat insulating means positioned subjacent said corrugated sheet.

14. A heat transfer panel as defined in claim 10 wherein,
said glazing means is provided by a plurality of tubular transparent members, said transparent members having an exterior surface formed to substantially mate with said recesses in said support surface and distorting said envelope to conform to said recesses, and
a glazing sheet positioned in superimposed relation to said tubular transparent members to define air chambers between said tubular transparent members.

* * * * *

UNITED STATES PATENT AND TRADEMARK OFFICE
CERTIFICATE OF CORRECTION

PATENT NO. : 4,205,658
DATED : June 3, 1980
INVENTOR(S) : Peter C. Clark

It is certified that error appears in the above-identified patent and that said Letters Patent are hereby corrected as shown below:

Col. 2, line 34, delete "interface" and insert ---interfere---;

Col. 3, line 38, delete "receses" and insert ---recesses---;
         line 57, delete "3-" and insert ---3-3---;

Col. 4, line 64, delete "evely" and insert ---evenly---;

Col. 5, line 15, delete "flid" and insert ---fluid---;
         line 58, delete "opening" and insert ---openings---;

Col. 6, line 14, after "water" and before "heat" delete "of" and insert ---or---;
         line 53, after "is" and before "important" insert ---also---;

Col. 7, line 48, after "available" delete "b";

Col. 10, line 5, delete "advantage" and insert ---advantages---;

Col. 11, lines 17-18, delete "advantages" and insert ---advantageous---;
         line 24, after "10" and before "per" insert ---gallons---;
         line 38, delete "threin" and insert ---therein---;
         line 60, delete "32" and insert ---332---;

Claim 2--Col. 12, line 50, after "portions and" and before "to" insert ---recesses---;

Claim 3--Col. 12, line 64, after "conform" and before "at" insert ---to the configuration of said

UNITED STATES PATENT AND TRADEMARK OFFICE
CERTIFICATE OF CORRECTION

PATENT NO. : 4,205,658

DATED : June 3, 1980

INVENTOR(S) : Peter C. Clark

It is certified that error appears in the above-identified patent and that said Letters Patent are hereby corrected as shown below:

Continued Claim 3--Col. 12, line 64.....
 support surface to provide---;

Claim 10--Col. 14, line 15, delete "monted" and
 insert ---mounted---; and

Claim 5---Col. 13, line 17, delete "surfaces" and insert
 ---surface---.

Signed and Sealed this

Ninth Day of December 1980

[SEAL]

Attest:

SIDNEY A. DIAMOND

Attesting Officer

Commissioner of Patents and Trademarks